US007933980B2

(12) United States Patent
Bowser

(10) Patent No.: US 7,933,980 B2
(45) Date of Patent: Apr. 26, 2011

(54) RELIABLE MANAGEMENT COMMUNICATIONS PATH ALGORITHM USING IN-BAND SIGNALING AND HIGH PRIORITY CONTEXT PROCESSING

(75) Inventor: Robert Bowser, Copley, OH (US)

(73) Assignee: Cisco Technology, Inc., San Jose, CA (US)

( * ) Notice: Subject to any disclaimer, the term of this patent is extended or adjusted under 35 U.S.C. 154(b) by 1127 days.

(21) Appl. No.: 11/067,830

(22) Filed: Feb. 28, 2005

(65) Prior Publication Data

US 2006/0195632 A1    Aug. 31, 2006

(51) Int. Cl.
*G06F 15/177* (2006.01)

(52) U.S. Cl. ............ 709/221; 709/223; 709/207; 714/2; 714/34

(58) Field of Classification Search .......... 709/247–250, 709/203–232, 200; 370/352, 389, 229, 235–237, 370/400, 412–418, 428–429; 713/1, 2, 100; 714/2–6, 9, 15, 34, 51
See application file for complete search history.

(56) References Cited

U.S. PATENT DOCUMENTS

| | | | |
|---|---|---|---|
| 5,559,958 A | | 9/1996 | Farrand et al. |
| 6,115,748 A | * | 9/2000 | Hauser et al. ................. 709/234 |
| 6,157,623 A | * | 12/2000 | Kerstein ........................ 370/315 |
| 6,324,644 B1 | * | 11/2001 | Rakavy et al. ..................... 713/1 |
| 6,411,616 B1 | * | 6/2002 | Donahue et al. .............. 370/352 |
| 6,476,854 B1 | | 11/2002 | Emerson et al. |
| 6,609,151 B1 | * | 8/2003 | Khanna et al. ................. 709/222 |
| 6,681,232 B1 | * | 1/2004 | Sistanizadeh et al. ..... 707/104.1 |
| 6,748,423 B1 | * | 6/2004 | Khanna et al. ................. 709/210 |
| 6,771,653 B1 | * | 8/2004 | Le Pennec et al. ........... 370/412 |
| 6,990,114 B1 | * | 1/2006 | Erimli et al. ................... 370/412 |
| 6,999,995 B2 | * | 2/2006 | Khanna et al. ................. 709/208 |
| 7,116,635 B2 | * | 10/2006 | Nakano et al. ................. 370/230 |
| 7,143,153 B1 | * | 11/2006 | Black et al. .................... 709/223 |
| 7,349,991 B2 | * | 3/2008 | Khanna et al. ................. 709/248 |
| 7,379,475 B2 | * | 5/2008 | Minami et al. ................ 370/469 |
| 2003/0030664 A1 | | 2/2003 | Parry |
| 2003/0185152 A1 | * | 10/2003 | Nederveen et al. ........... 370/229 |
| 2004/0156360 A1 | * | 8/2004 | Sexton et al. .................. 370/389 |
| 2005/0232153 A1 | * | 10/2005 | Bishop et al. ................. 370/235 |
| 2006/0092832 A1 | * | 5/2006 | Santoso et al. ................ 370/218 |

* cited by examiner

*Primary Examiner* — William C. Vaughn, Jr.
*Assistant Examiner* — Greg Bengzon
(74) *Attorney, Agent, or Firm* — Tucker Ellis & West LLP

(57) ABSTRACT

Disclosed herein is a highly reliable management communication path to the CPU of a network device using in-band signaling by periodically servicing the Ethernet MAC, such as during system tick and/or watchdog timer refresh interrupts. The servicing selectively processes frames that are uniquely destined to or originating from a managing device. There are several possible techniques to uniquely identify frames as management frames. For example, one technique to identify a management frame involves the addition of an Ethernet MAC address to be used only for management frames, another technique employs a dedicated VLAN to be used only for management frames, a third technique employs a dedicated Layer 2 frame type for management frames, and another technique involves configuring the Ethernet MAC to operate in promiscuous mode and only process frames sent and received as unicast frames using a fixed source or destination MAC address.

15 Claims, 4 Drawing Sheets

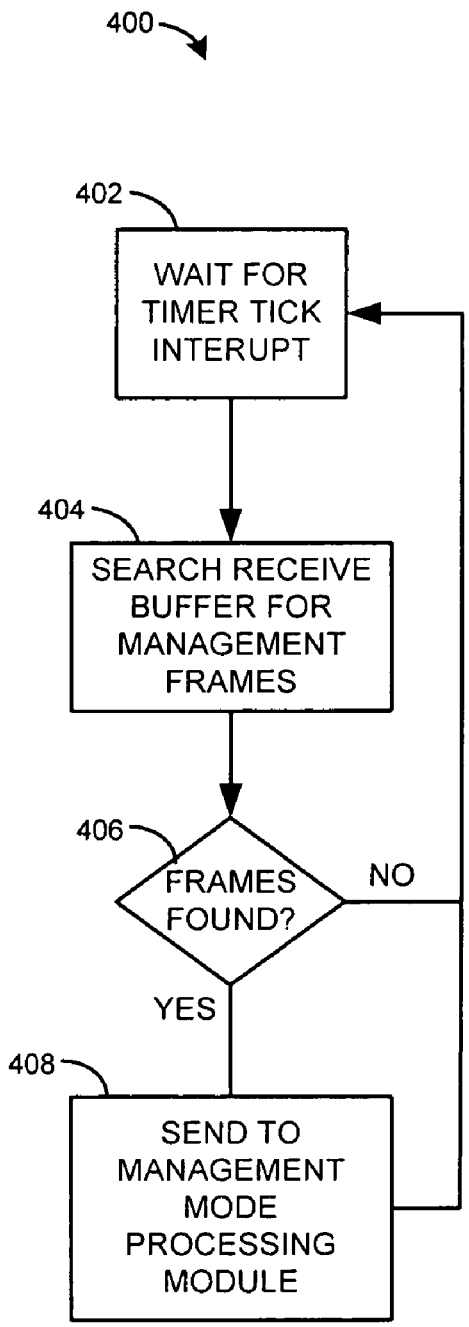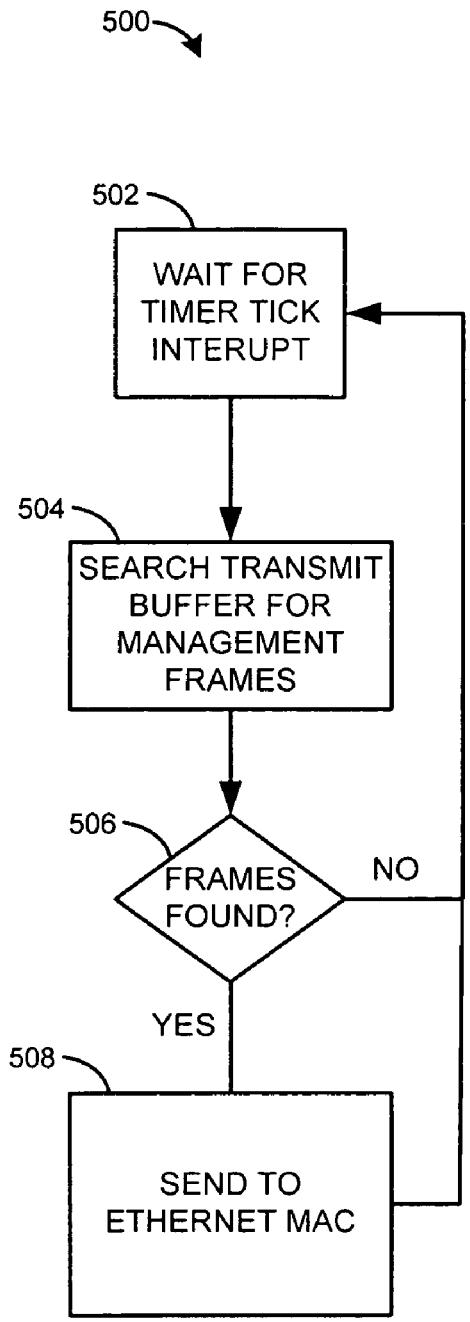
FIGURE 4                    FIGURE 5

RELIABLE MANAGEMENT COMMUNICATIONS PATH ALGORITHM USING IN-BAND SIGNALING AND HIGH PRIORITY CONTEXT PROCESSING

BACKGROUND OF THE INVENTION

The present invention relates generally to configuration and management of computing devices and more specifically to a technique for remotely configuring, managing, and debugging a network device.

It is desirable to include a highly reliable management communication path to a network device to be used for configuring, managing and debugging the device. This typically takes the form (in a conventional wireless LAN (Local Area Network access point (AP)) of a dedicated console port connection to the CPU of the network device. Using a dedicated connection ensures that a reliable communication path is available even when the network device is not reachable using one of its native network interfaces. Native network interfaces may become unreachable due to misconfiguration, overflow of buffers or software runaway. A disadvantage to using a dedicated communication channel is that there is a cost burden associated with the extra cable, connector, transceiver, passive devices, additional space required on the device enclosure and additional area needed on the PCB (Printed Circuit Board). This additional cost burden becomes significant on lower cost/smaller form factor network devices such as wireless LAN access points. Furthermore the cost impact becomes significant when every network device includes such a dedicated connection.

In the past, the network administrator operating from a local computer could telephonically connect into the operating system of a remote server to monitor its health using a conventional communications package such as PC Anywhere or Procomm. This method required a third communications computer to be attached to the network. Typically, a connection would first be established from the local computer to the communications computer attached to the network of the server. If the server was operating, the network administrator would be prompted for a login password to access network resources, including the server. If the server was down, only the personal computer could be accessed (providing that PC had its own modem). After the administrator logged into the network, a server console utility, such as RCONSOLE, could be executed to gain access to the server. Because many times the server would be down, this method had limited usefulness. Additionally, only limited information was provided, since the server would have to be operating before the server console utility would operate.

Another technique that has been tried to reduce the cost burden of a dedicated console port interface is by using out of band communication signaling using unused pairs within the same Ethernet cable. However, this technique assumes that there are additional unused pairs available, which is not always true. Furthermore, this technique still requires some additional dedicated hardware for the management console interface.

Thus, the need exists for a reliable method for performing remote management of a networked device that does not require additional hardware. It would be desirable that the method be able to perform all functions ordinarily available to a console connection coupled directly to the network device. It would also be desirable for the method to be able to manage the device even when the device's native network interface is otherwise unreachable due to misconfiguration, overflow of buffers or software runaway.

BRIEF SUMMARY OF THE INVENTION

The present invention provides a highly reliable management communication path to the CPU of a network device using in-band signaling. In a preferred embodiment, this is achieved by servicing the Ethernet Medium Access Controller during system tick (and/or watchdog timer refresh) interrupts. This additional servicing will selectively process packets that are uniquely destined to or originating from a managing device. To avoid performance impacts of this approach the additional servicing will only be performed during a fraction of the total system tick interrupt interval. This periodic servicing (herein named "management mode servicing") will allow sufficient servicing since the bandwidth characteristics of a management communication path is low compared to that of the typical data communications path.

The number of periods of "management mode servicing" may be configurable based on the desired management communication path throughput and allowable data communication path throughput impact. One possible method of configuring this would be the number of times that the "management mode servicing" is performed out of every 256 system ticks. It would be desirable to use configuration parameters that are even binary numbers so that simple arithmetic mask operations can be used to keep "normal path" software performance impacts low when determining if the additional servicing needs to be performed per system tick.

When performing "management mode servicing" the network device will determine that a packet is a management packet and send it to existing management interface routines. Such routines include (but are not limited to) command line interface routines, web interface routines and SNMP routines.

Since this management communications path is serviced periodically the protocol used to discover and carryout management messages should use suitable guaranteed delivery mechanisms such as positive acknowledgement and packet sequence numbering. Any low level protocol can be used to implement this management packet, preferably the protocol should be simple and not have any configurable parameters so that misconfiguration is avoided.

A benefit of using a single established connection for the management communication path is that the network device does not need to be accessible. This is useful when the network device is in a location which is inconvenient or is otherwise inaccessible (due to high ceiling or hazardous area, etc.).

An aspect of the present invention is that no additional hardware changes are required for existing designs (obviates the need to populate console port hardware for existing designs). Yet another aspect of the present invention is that cost savings are realized when eliminating console port hardware since no additional hardware is needed to implement this approach.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention.

FIG. 4 is a block diagram of a method in accordance with an aspect of the present invention.

FIG. 5 is a block diagram of a method for sending a management frame to an external device in accordance with an aspect of the present invention.

DETAILED DESCRIPTION OF INVENTION

Figure 1:
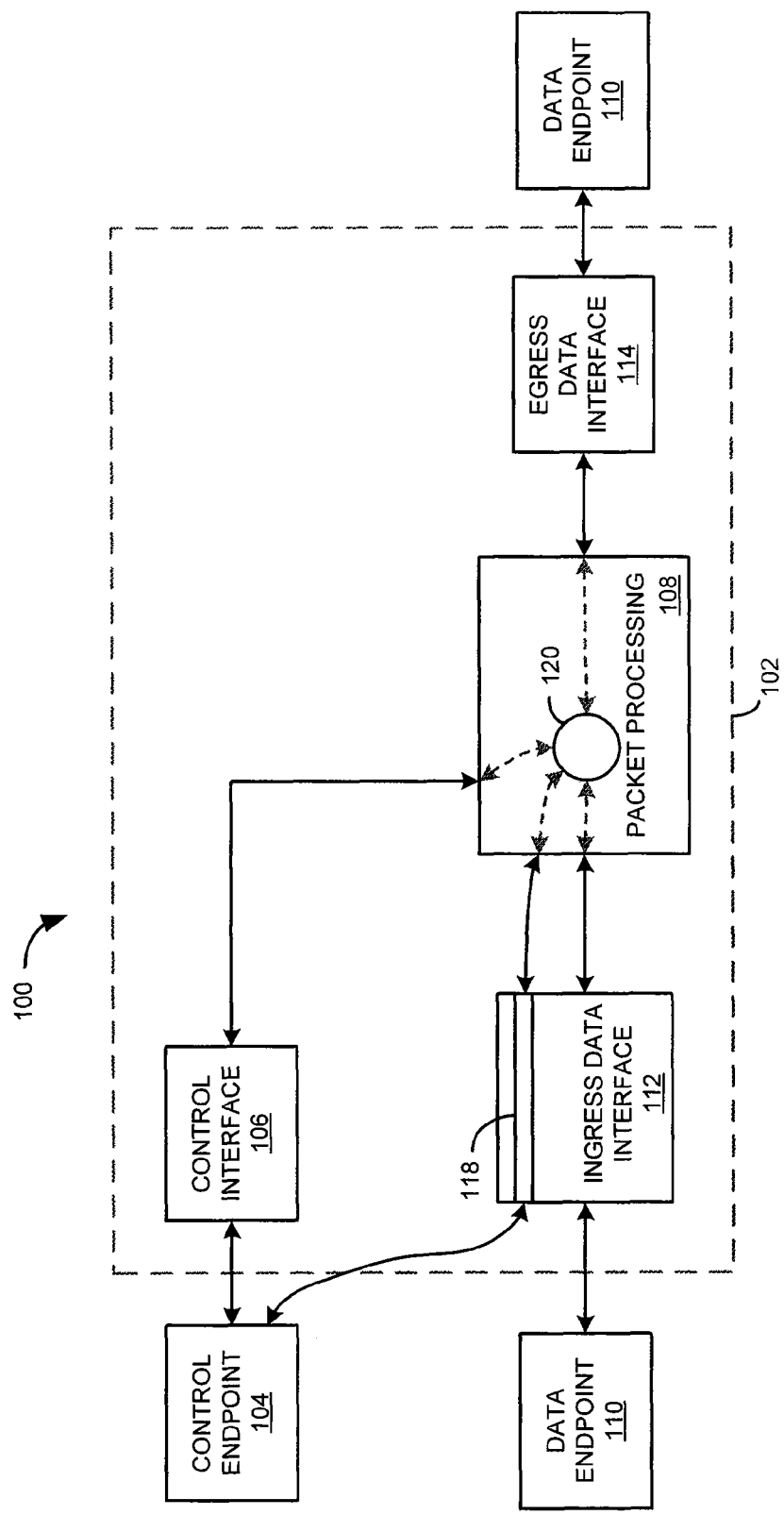
FIG. 1 is a simplified block diagram of a system in accordance with an aspect of the present invention.

Throughout this description, the preferred embodiment and examples shown should be considered as exemplars, rather than limitations, of the present invention.

The present invention provides a highly reliable management communication path to the CPU of a network device using in-band signaling. This is achieved by servicing the Ethernet Medium Access Controller during system tick (and/or watchdog timer refresh) interrupts. This additional servicing will selectively process packets that are uniquely destined to or originating from a managing device. To avoid performance impacts of this approach the additional servicing will only be performed during a fraction of the total system tick interrupt interval. This periodic servicing (herein named "management mode servicing") will allow sufficient servicing since the bandwidth characteristics of a management communication path is low compared to that of the typical data communications path.

There are several possible approaches that are suitable to uniquely identify packets as management packets. Although several approaches are described herein, those skilled in the art can readily appreciate that other approaches are also equally adaptable for use with the present invention and should also be considered a part of the present invention.

For an approach that requires a configuration change to the Ethernet Medium Access Controller (MAC), the configuration would be changed for the duration of time between successive system tick interrupts. The duration of time that the Ethernet MAC would be configured for this special mode would be limited by the configuration parameter that controls the number "management mode servicing" intervals.

One possible approach that could be used to identify a management packet involves the addition of an Ethernet MAC address to be used only for management packets. The network device employing this approach will take necessary actions to allow upstream switching to learn this additional MAC address to be used for management packets.

A second approach that could be used to identify a management packet involves a dedicated VLAN to be used only for management packets.

A third approach that could be used to identify a management packet involves a dedicated (and possibly proprietary Layer 2 packet type to be used only for management packets.

A fourth approach that could be used to identify a management packet involves configuring the Ethernet MAC to operate in promiscuous mode and only process packets sent and received as unicast packets using a fixed source or destination MAC address.

Existing MAC servicing may also optionally service what is identified as a management packet and will send the packet to the appropriate management software routine. This "normal" servicing may serve as a communication path during times that the Ethernet interface is operational but the network device will rely on "management mode servicing" in the system tick service routine for times that the Ethernet interface is not operating as desired.

Ethernet speed and duplex operation will not be altered while operating in the "management mode" as these parameters can be adjusted on the upstream network device if they are inadvertently changed on the network device that includes the feature described by this specification.

Performing packet processing in this context on a periodic basis ensures that system throughput impacts are minimized. The processing is guaranteed to occur due to the requirement that the system tick/watchdog timer refresh must occur. If the processing does not occur then the system will not be in an operable state in any case. As stated previously herein, the frequency of the "management mode servicing" could be a configurable parameter and at a minimum this processing would take the place of the processing of no more than a single packet per second (for platforms that have a shared management communications and data communications processing entity).

FIG. 1 is a simplified block diagram of a system 100 in accordance with an aspect of the present invention. A network device 102 has an ingress data interface 112 and a control interface 106 connected to a packet processing module 108. Packet processing module 108 is comprised of one or more of an application specific integrated circuit (ASIC), a central processing unit (CPU) or customized logic. "Logic", as used herein, includes but is not limited to hardware, firmware, software and/or combinations of each to perform a function (s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

Packet processing module 108 is coupled to an egress data interface 114. Egress data interface 114 is coupled to an external data endpoint 116. A control endpoint 104 is coupled to control interface 106. Data endpoint 110 is coupled to ingress data interface 112.

As shown, the control endpoint 104 is a console connection used for managing network device 102 by sending commands and receiving data via control interface 106. Network data is received from data endpoint 110 via ingress data interface 112, and data is sent over the network by egress data interface 114 via data endpoint 116. Packets are received by buffers 120 located within packet processing module 108. Packet processing module 108 services the buffers.

As used herein, the data plane is defined as the path from ingress data interface 112, packet processing module 108 and egress data interface 114. Typically, a packet in the data plane is received by ingress data interface 112 and forwarded to packet processing module 108. Packet processing module 108 performs some action on the packet and then it is forwarded to the egress data interface 114.

In accordance with an aspect of the present invention, control endpoint 104 sends its packet to ingress data interface 112 instead of control interface 106. This obviates the need for control interface 106, thus control interface 106 can be eliminated. As illustrated, the packet is routed through a separate data path 118, such as a tunnel, within ingress data interface 112. However, it is also contemplated that the management frames can be sent on the same path as frames from data endpoint 110, and forwarded by ingress data interface to packet processing module 108.

When a typical packet arrives on the data plane, it is placed in buffer 120 and an interrupt is generated. However, due to system malfunctions, such as buffer overflow and/or software runaway, packet processing module 108 can get clogged. An aspect of the present invention is that packet processing module 108 periodically searches through buffer 120 for management packets. For example, packet processing module 108 can search through buffer 120 whenever there is a timer tick interrupt. In another embodiment, time tick interrupts can be masked so that processing module 108 searches for management frames during certain interrupts, for example 1 out of every 256 interrupts, or two out of every 256 interrupts, etc.

Any type of frame that can be sent by control endpoint 104 can be sent through data path 118 to packet processing module 108. Such management frames include but are not limited to set network identifier, set IP address, set IP subnet mask, turn debug mode on or off. However, because the IP address or IP subnet mask can change, management packet should use layer 2 addressing (e.g., MAC address) to ensure delivery. An advantage of the present invention is that it can fix IP address, IP subnet mask, and/or IP stack without having to physically connect to the network device. The present invention is suitably adapted to any type of network device, including but not limited to network computers, wireless access points, routers, and wireless switches.

There are several potential techniques available for packet processing module 108 to identify management frames in buffer 120. One possible approach that could be used to identify a management packet involves the addition of an Ethernet MAC address to be used only for management packets. A network device employing this approach will take necessary actions to allow upstream switching to learn this additional MAC address to be used for management packets. A second approach that could be used to identify a management packet involves a dedicated VLAN to be used only for management packets. A third approach that could be used to identify a management packet involves a dedicated (and possibly proprietary Layer 2 packet type to be used only for management packets. A fourth approach that could be used to identify a management packet involves configuring the Ethernet MAC to operate in promiscuous mode and only process packets sent and received as unicast packets using a fixed source or destination MAC address. The techniques for distinguishing a management frame for other packets are not limited to those described herein, but can include any technique which enables a frame of one class to be differentiated from a frame of another class.

Packet processing module 108 may also optionally service a management packet and/or send the packet to an appropriate management software routine (not shown). During normal operations, packet processing module 108 may service any packet in buffer 120 received through ingress data interface 112. However, during management frame processing mode, which can be triggered by interrupts, packet processing module 108 can be limited to service only management frames. By periodically triggering a process that specifically services management frames, the present invention enables a remote control endpoint 104 to service a network device 102 which may be otherwise unavailable.

Figure 2:
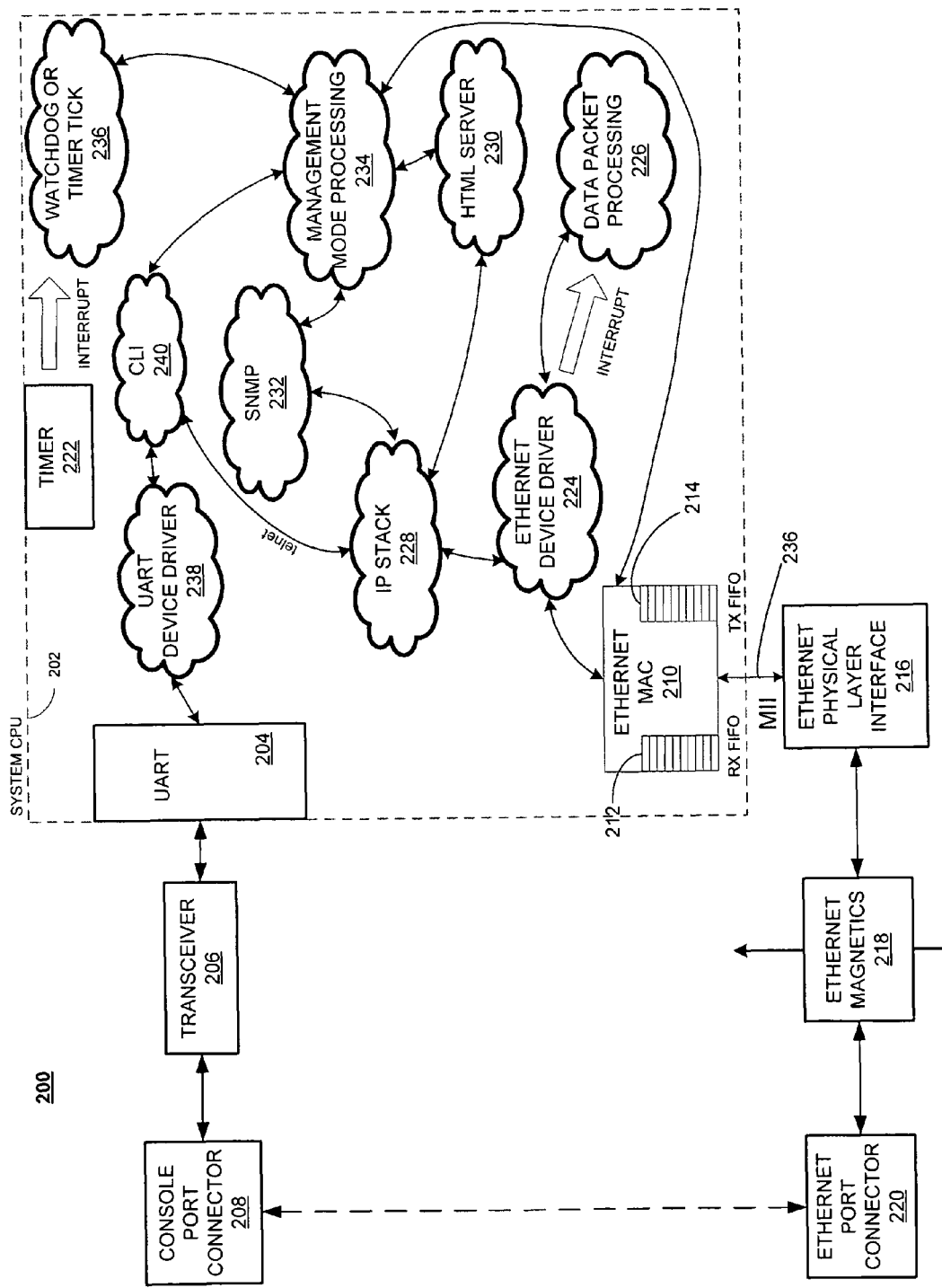
FIG. 2 is a detailed block diagram of a network device configured in accordance with an aspect of the present invention.

FIG. 2 is a detailed block diagram of a network device 200 configured in accordance with an aspect of the present invention. Network device 200 is suitably any computing component capable of being networked, such as computers, access points, routers, and wireless switches. As illustrated in FIG. 2, hardware components have straight lines, whereas software components have curvilinear lines. However, those skilled in the art can readily appreciate that any of the software components can also be implemented in hardware or a combination of hardware and software.

As illustrated, system CPU 202 has a UART 204 that is coupled to transceiver 206 to a console port (connector) 208. In addition, system CPU 202 has an Ethernet MAC coupled via a bi-directional media independent interface (MII) 236 to an Ethernet Physical Layer interface (PHY) 216. Ethernet Physical Layer interface 216 is coupled to Ethernet magnetics 218. Ethernet magnetics 218 basically provide isolation magnetics for physical layer interface 216. Ethernet magnetics 218 is coupled to Ethernet port (connector) 220.

In operation, an administrator desiring to configure system 200 can use a device adapted to connect to console port 208, which uses transceiver 206 to bi-directionally transfer signals to UART 204. UART device driver (DD) 138 provides a software interface between the UART hardware and CPU 202. Packets are sent and received from command line interface module (CLI) 240.

When system 200 is in operational mode, packets are sent and received from a network (not shown) coupled to Ethernet port 220. The packets are routed through Ethernet magnetics 218 and Ethernet physical layer interface 216 via MII 236 to Ethernet Media Access Controller (MAC) 210. As illustrated, Ethernet MAC 210 has two buffers, a Receive First In First Out buffer (RX FIFO) 212 and a Transmit First In First Out buffer (TX FIFO) 214. Packets arriving from Ethernet port 220 are routed into RX FIFO 212. Packets to be sent out via Ethernet port 220 are stored in TX FIFO 214. Ethernet driver 224 functions as a software interface between Ethernet MAC 210 and CPU 202 and its various modules. Typically, when a packet arrives in RX FIFO 212 of Ethernet MAC 210, an interrupts is generated. The packet is forward via Ethernet driver 224 to data packet processing module 226 which performs the appropriate action on the packet.

However, in accordance with an aspect of the present invention, management frames are received in band via Ethernet port 220, obviating the need for console port 208, transceiver 206, UART 204 and UART device driver 138. A benefit of this aspect is the cost and size of network device 200 can be reduced by eliminating console port 208, transceiver 206 and UART 204. Further savings and reduced complexity are realized by eliminating UART device driver 238.

When a management frame is received via Ethernet port 220, it is routed through Ethernet magnetics 218, Ethernet physical layer interface 216, MII 236 to RX FIFO 214 of Ethernet MAC 210. When the packet reaches Ethernet driver 224, it can be routed to IP Stack 228. Optionally, IP stack 228 routes the packet to Simple Network Management Protocol (SNMP) module 232, CLI 240 and/or HTML server 230.

However, in accordance with an aspect of the present invention, whenever there's a watchdog or timer tick 236, the Ethernet MAC 210 is polled by management mode processing module 234 and any management frames in RX FIFO 212 are forwarded to the management mode processing module 234.

Management processing module 234 can forward the packet to HTML server 230, SNMP 232 and/or CLI 240 as needed. In a preferred embodiment, timer 222 is coupled to watchdog or timer tick 236, which periodically generates an interrupt. The interrupt triggers management mode processing module 234 to search RX FIFO 212 of Ethernet MAC 212 for management frames. Management mode processing module 234 removes the management frames in RX FIFO 212 and routes them to the appropriate module (e.g., HTML server 230, SNMP 232, CLI 240, which can further route the management frame, or a portion of the management frame to IP stack 228.

In an embodiment of the present invention, watchdog or timer tick module 236 triggers management mode frame processing module 234 during every interrupt. However, in other embodiments, the triggering of management mode frame processing module 234 is configurable. For example, watchdog or timer tick module 236 can use a mask or other technique to limit how many times or when management mode frame processing module 234 is triggered. For example, management mode frame processing module 234 can be triggered once every 256 interrupts, or any combination of interrupts, e.g., every 1st, 2nd, and 100th interrupt out of a 256 interrupt cycle. In preferred embodiments, a benefit of coupling management mode processing module 234 to the watchdog or timer tick module 236, is that it ensures that management frames will be periodically processed, even when other modules of network device 200 are malfunctioning. This is because watchdog or timer tick interrupts have high priority and can be relied on for executing even when the network device 200 is not functioning. Thus ensuring the in band management frames are processed.

In some embodiments, management mode processing module 234 is also used for ensuring management frames are transmitted from network device 200. This is useful in debugging operations and for sending data to a network administrator or other user at a remote location troubleshooting or configuring network device 200. In some embodiments, management mode processing module 234 polls CLI 240, SNMP 232 and HTML server 230 and retrieves any outgoing packets from them.

The packets are then forwarded to TX FIFO 214 of Ethernet MAC 210 for transmission via MII 236 to Ethernet physical layer interface 216. In other embodiments, modules having management frames, such as CLI 240, SNMP 232, to HTML server 230 and IP stack 228 place packets in TX FIFO 214. Ethernet MAC 210 typically sends the frames out to Physical Layer Interface 216 autonomously without software intervention.

Optionally, when management mode processing module 234 is triggered it also searches TX FIFO 214 for management frames. Any management frames found in TX FIFO 214 are immediately forwarded to Ethernet physical layer interface 216 for transmission.

Figure 3:
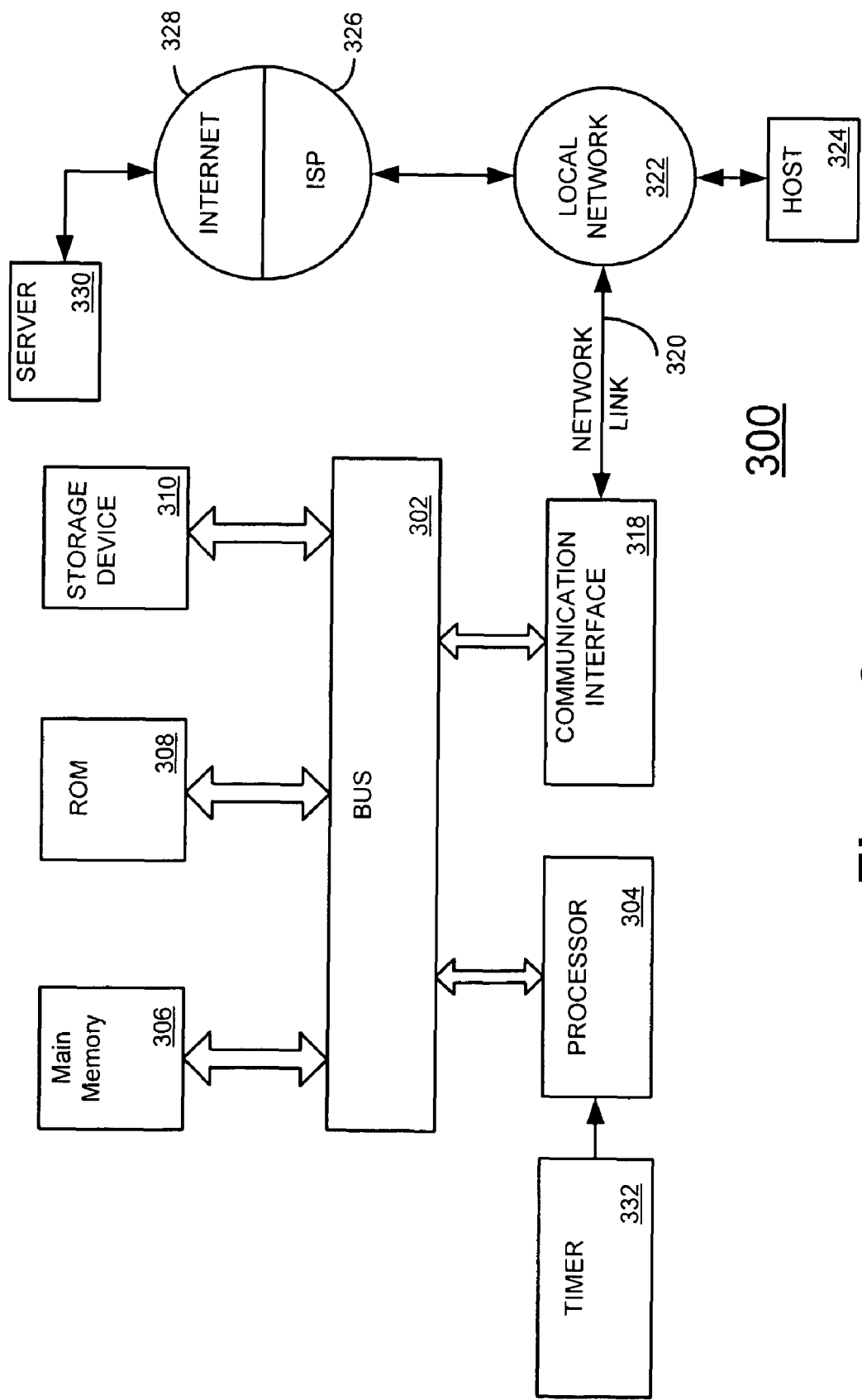
FIG. 3 is a block diagram of a computer system capable of being configured in accordance with an aspect of the present invention.

FIG. 3 is a block diagram that illustrates a computer system 300 upon which an embodiment of the invention may be implemented. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a ready only memory (ROM) 308 or other static storage device coupled to bus 302 for storing static information and instructions for processor 304. A storage device 310, such as a magnetic disk or optical disk, is provided and coupled to bus 302 for storing information and instructions.

The invention is related to the use of computer system 300 for reliable management communications using in-band signaling and high priority context processing. According to one embodiment of the invention, reliable management communications using in-band signaling is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, any other memory chip or cartridge, or any other medium from which a computer can read.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment is operated by an Internet Service Provider (ISP) 326. ISP 326 in turn provides data communications through the worldwide packet data communication network, now commonly referred to as the "Internet" 328.

Computer system 300 can send messages and receive data, including program codes and management frames, through the network(s), network link 320, and communication interface 318. In the Internet example, a server 330 might transmit a management frame through Internet 328, ISP 126, local network 322, and communication interface 318.

In accordance with an aspect of the present invention, timer 332 is coupled to processor 304. Timer 332 is used to periodically generate interrupts causing processor 304 to communicate with communication interface 318 via bus 302. This enables processor 304 to periodically send or receive management frames that are stored in communication interface 318.

In view of the foregoing structural and functional features described above, a methodology in accordance with various aspects of the present invention will be better appreciated with reference to FIGS. 4 and 5. While, for purposes of simplicity of explanation, the methodology of FIGS. 4 and 5. is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. Embodiments of the present invention are suitably adapted to implement the methodology in hardware, software, or a combination thereof. The methodologies illustrated in FIGS. 4 and 5 may be implemented in software, hardware or a combination of hardware and software.

FIG. 4 is a block diagram of a method 400 in accordance with an aspect of the present invention. In preferred embodiments, method 400 is used for processing received management frames for managing a network device. Types of management frames serviced by the methodology include but are not limited to frames for setting a network identifier, setting an IP address, setting an IP subnet mask, turning debug mode on or off, and processing of packets for debugging. Method 400 is adaptable for system 100 (FIG. 1), network device 200 (FIG. 2) as well as computer system 300 (FIG. 3) and any other computing device, such as a personal computer, access point, router or wireless switch.

At 402, the method 400 waits for a periodic event such as a watchdog or timer tick interrupt. Watchdog or timer tick interrupts can be employed because they generate high priority interrupts which should be serviced irregardless of the operating state of the network device. However, any type of timing system that can trigger the process is acceptable. Preferably, the timing system is a high priority event so that it executes irregardless of the operating state of the network device. This ensures that management frames will get processed regardless of the state of the network device.

During or after the periodic event at 402 has occurred, at 404, the receive buffer of the network device is searched for management frames. The receive buffer may be any time of memory device, such as a FIFO. There are several possible techniques that methodology 400 can utilize to identify management frames. For example, one possible approach that could be used to identify a management packet involves searching for frames with an Ethernet MAC address that is to be used only for management packets. A network device employing this approach will take necessary actions to allow upstream switching to learn this additional MAC address to be used for management packets. Another technique that could be used to identify a management packet involves searching for packets on a dedicated VLAN to be used only for management packets. Still another technique that could be used to identify a management frame involves searching for a dedicated (and possibly proprietary Layer 2 packet type to be used only for management packets. Yet another technique that could be used to identify a management packet is searching for unicast packets with a fixed source or destination MAC address (.e.g., one or more of a predefined unicast source address, unicast destination address, multicast destination address, and multicast source address). The techniques for distinguishing a management frame for other packets are not limited to those described herein, but can include any suitable technique which enables a frame of one class to be differentiated from a frame of another class.

If at 406, it is determined there were no management frames in the receive buffer, then processing returns to 402 and method 400 waits for the next periodic event. However, if at 406 it is determined that management frames were processed, then at 408 the frames are sent from the receive buffer to a management mode processing module for processing. Preferably, the management frames are removed from the buffer after being sent to the management mode processing module so that they are not repeatedly processed during subsequent periodic events. The management mode processing module performs whatever actions are necessary to process the packet. For example, the management module processor can set one or more of the network device's network identifier, IP address, subnet mask, turn debug mode on or off, or send commands (.e.g., debugging commands) to the network device's processor for execution.

FIG. 5 is a block diagram of a method 500 for sending a management frame to an external device in accordance with an aspect of the present invention. Management mode processing redirects outgoing frames from software entities (e.g., SNMP, CLI and/or HTML server) and submits them to the Ethernet MAC. The Ethernet MAC typically sends the outgoing frames to the Ethernet Physical layer interface autonomously without software intervention. In preferred embodiments, method 500 is used for processing management frames to be sent by a network device. For example, methodology 500 can be used to send data to a remote console managing the network device in debug mode, or to send the network device's current configuration data. Method 500 is adaptable for system 100 (FIG. 1), network device 200 (FIG. 2) as well as computer system 300 (FIG. 3) and any other computing device, such as a personal computer, access point, router or wireless switch.

At 502, the method 500 waits for a periodic event such as a watchdog or timer tick interrupt. Watchdog or timer tick interrupts can be employed because they generate high priority interrupts which should be serviced irregardless of the operating state of the network device. However, any type of timing system that can trigger the process is acceptable. Preferably, the timing system is a high priority event so that it executes irregardless of the operating state of the network device. This ensures that management frames will get processed regardless of the state of the network device. Thus, method 500 provides a reliable management communications path algorithm using in-band signaling and high priority context processing.

During or after the periodic event at 502 has occurred, at 504, the transmit buffer of the network device is searched for management frames, including transmit buffers of various software modules such as SNMP, CLI and/or HTML server. The transmit buffer may be any time of memory device, such as a FIFO. There are several possible techniques that methodology 500 can utilize to identify management frames. For example, one possible approach that could be used to identify a management packet involves searching for frames with an Ethernet MAC address that is to be used only for management packets. A network device employing this approach will take necessary actions to allow upstream switching to learn this additional MAC address to be used for management packets. Another technique that could be used to identify a management packet involves searching for packets on a dedicated VLAN to be used only for management packets. Still another technique that could be used to identify a management frame involves searching for a dedicated (and possibly proprietary Layer 2 packet type to be used only for management packets. Yet another technique that could be used to identify a management packet is searching for unicast packets with a fixed source or destination MAC address (.e.g., one or more of a predefined unicast source address, unicast destination address, multicast destination address, and multicast source address). The techniques for distinguishing a management frame for other packets are not limited to those described herein, but can include any suitable technique which enables a frame of one class to be differentiated from a frame of another class.

If at 506, it is determined there were no management frames in the transmit buffer, then processing returns to 502 and method 500 waits for the next periodic event. However, if at 506 it is determined that management frames are available for processing at 508 the frames are submitted to the Ethernet MAC which then typically sends them out to the physical layer interface. The physical layer interface would then pass the management frame on the network to another network device, such as a remote console. Preferably, the management frames are removed from the buffer after being sent to the Ethernet MAC so that they are not repeatedly processed during subsequent periodic events. Thus, method 500 provides a reliable management communications path algorithm using in-band signaling and high priority context processing for sending packets to another network device such as a remote console.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims interpreted in accordance with the breadth to which they are fairly, legally and equitably entitled.

The invention claimed is:

1. A method for managing an associated network device using in-band communication signaling, the method comprising:

generating an interrupt in accordance with handling of a primary data communication session via the network device via an interrupt generator coupled to a management mode processor;

receiving packets including one or more management frames in a management communication session occurring in-band with a plurality of data frames of the primary communication session via a common ingress data interface therewith of the associated network device;

storing the packets received at the ingress data interface into a buffer in a data plane with the ingress data interface, the packets stored in an order in which received;

processing, via the management mode processor, the packets in the order in which the packets are received into the buffer, the processing further including periodically initiating a management mode servicing process in accordance with the generated interrupt from the coupled interrupt generator to search the buffer to determine whether any of the unprocessed stored packets are the one or more management frames, wherein the determining whether any of the unprocessed stored packets are the one or more management frames further includes determining whether a frame has a special MAC (Media Access Control) address used for management frames;

sending, in accordance with the generated interrupt, the one or more management frames determined by the management mode servicing process from the data plane to a management frame interface routine of the associated network device;

selectively limiting the processing of the packets stored in the buffer to management frames during operation of the management mode servicing process in accordance with a preselected duration corresponding to the generated interrupt; and processing the one or more management frames;

wherein the one or more management frames is one of the group consisting of set network identifier, set IP address, and set subnet mask.

2. A method according to claim 1, wherein the initiating is triggered by one of the group consisting of a watchdog timer and a timer tick interrupt.

3. A method according to claim 2, wherein the initiating is triggered by a predetermined timer tick interrupt selected from a plurality of timer tick interrupts.

4. A method according to claim 1, wherein the method is for managing an associated network device including one of the group consisting of a router, an access point and a wireless switch.

5. A method according to claim 1, wherein the data plane comprises a stack that contains a data frames addressed to the associated network device and the one or more management frames, the sending step comprises removing the one or more management frames from the stack.

6. A method according to claim 1, wherein the data plane comprises a receive buffer and a transmit buffer, the method further comprising:

determining whether any packets stored in the transmit buffer are the one or more management frames;

removing a management frame from the transmit buffer; and sending the management frame to the physical layer interface;

wherein the transmit buffer contains at least one data frame and at least one management frame before the management frame is removed from the transmit buffer.

7. A method according to claim 1, wherein the determining further includes determining whether a frame is addressed to a dedicated VLAN used for management frames.

8. A method according to claim 1, wherein the determining further includes determining whether a frame is a layer 2 frame type dedicated to management frames.

9. A method according to claim 1, wherein the determining further includes determining whether a frame has one of the group consisting of a designated unicast destination address, a designated unicast source address, and a designated multicast address.

10. A non-transitory computer readable medium storing computer instructions, comprising:

instructions for processing a management frame for managing a network device;

instructions for generating an interrupt in accordance with handling of a primary data communication session;

instructions for receiving frames in a data plane, the received frames comprising at least one data frame and at least one management frame;

instructions for storing the received frames in the data plane in an order in which the frames are received;

instructions for processing the stored received frames in the order in which the frames are received in the data plane;

instructions for searching the stored received for management frames;

instructions for periodically initiating the instructions for searching in accordance with the generated interrupt; and instructions for sending, in accordance with the generated interrupt, a management frame from the stored received frames to the instructions for processing a management frame responsive to determining at least one unprocessed frame in the stored received frames is a management frame;

wherein the instructions for processing the stored received frames is responsive to the receiving the frames and the instructions for periodically initiating the instructions for searching is responsive to one of the group consisting of a watchdog timer and a timer tick interrupt, and wherein the instructions for processing the stored received frames is selectively limited to processing stored unprocessed management frames responsive to initiation of the instructions for searching in accordance with a preselected duration corresponding to the generated interrupt;

wherein the instructions for processing processes the management frame;

wherein the instructions for searching the stored received frames further includes instructions for determining whether a frame has a special MAC address used for management frames; and wherein the one or more management frames is one of the group consisting of set network identifier, set IP address, and set subnet mask.

11. A computer readable medium according to claim 10, further comprising a receive buffer in the data plane and a transmit buffer in the data plane;

instructions for determining if any frames in the transmit buffer are management frames;

instructions for removing a management frame from the transmit buffer responsive to the instructions for determining if any frames in the transmit buffer are management frames determines a frame in the transmit buffer is a management frame; and instructions for sending the management frame to the physical layer interface responsive to the instructions for determining if any frames in the transmit buffer are management frames.

12. A computer readable medium according to claim 10, wherein the instructions for determining if any frames in a data plane are management frames further includes instructions for determining whether a frame is addressed to a dedicated VLAN used for management frames.

13. A computer readable medium according to claim 10, wherein the instructions for determining if any frames in a data plane are management frames further includes instructions for determining whether a frame is a layer 2 frame type dedicated to management frames.

14. A computer readable medium according to claim 10, wherein the instructions for determining if any frames in a data plane are management frames further includes instructions for determining whether a frame has one of the group consisting of a designated unicast destination address, a designated unicast source address, and a designated multicast address.

15. A system, comprising:

a physical layer interface coupled to a network and adapted to send frames and receive frames via the network;

a media access control layer interface coupled to the physical layer interface, the media access control layer interface having a transmit buffer and a receive first in first out buffer;

a central processing unit coupled to the media access control layer interface adapted for executing instructions from a computer readable medium;

a first interrupt generator adapted for generating an interrupt in accordance with frames received in the receive first in first out buffer; and, a second interrupt generator adapted for generating interrupts at predetermined time intervals coupled to the central processing unit;

wherein the central processing unit is responsive to interrupts from the first interrupt generator to process the frames received in the receive first in first out buffer and from the second interrupt generator to search the receive first in first out buffer for a management frame retrieve a management frame during the search and forward the management frame to a control interface;

wherein the central processing unit determines whether a frames in the first in first out buffer a frame is a management frame based on whether a frame has a special MAC (Media Access Control) address;

wherein the central processing unit selectively limits processing of frames received in the receive first in first out buffer to management frames responsive to the interrupt from the second interrupt generator in accordance with a preselected duration;

wherein the central processing unit processes the management frame; and wherein the one or more management frames is one of the group consisting of set network identifier, set IP address, and set subnet mask.

* * * * *